(12) United States Patent
Demura et al.

(10) Patent No.: US 8,297,041 B2
(45) Date of Patent: Oct. 30, 2012

(54) EXHAUST GAS PURIFICATION APPARATUS FOR INTERNAL COMBUSTION ENGINE

(75) Inventors: Takayuki Demura, Mishima (JP); Masakazu Yamamoto, Kariya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 815 days.

(21) Appl. No.: 12/443,981

(22) PCT Filed: Oct. 3, 2007

(86) PCT No.: PCT/JP2007/069783
§ 371 (c)(1),
(2), (4) Date: Apr. 2, 2009

(87) PCT Pub. No.: WO2008/044715
PCT Pub. Date: Apr. 17, 2008

(65) Prior Publication Data
US 2010/0031635 A1    Feb. 11, 2010

(30) Foreign Application Priority Data

Oct. 6, 2006  (JP) .................. 2006-275165

(51) Int. Cl.
F01N 3/00  (2006.01)
F01N 3/10  (2006.01)
F02D 41/14  (2006.01)
F02D 41/00  (2006.01)

(52) U.S. Cl. ............... 60/285; 60/299; 60/300; 60/301; 123/443; 123/673

(58) Field of Classification Search ............ 60/285, 60/286, 295, 299, 300, 301; 123/435, 443, 123/672, 673, 676, 692
See application file for complete search history.

(56) References Cited

U.S. PATENT DOCUMENTS

| 6,324,835 B1 | 12/2001 | Surnilla et al. |
| 6,341,487 B1 * | 1/2002 | Takahashi et al. ............. 60/286 |
| 6,557,505 B1 * | 5/2003 | Hori ............................ 123/90.11 |
| 2002/0038541 A1 * | 4/2002 | Sumilla et al. ................. 60/274 |
| 2003/0172647 A1 | 9/2003 | Tanaka |

FOREIGN PATENT DOCUMENTS

| EP | 1 205 648 B1 | 3/2006 |
| GB | 2 355 945 B | 10/2003 |
| JP | 8 189388 | 7/1996 |
| JP | 2000 227038 | 8/2000 |
| JP | 2001 227379 | 8/2001 |
| JP | 2003 269148 | 9/2003 |

OTHER PUBLICATIONS

Extended Supplementary European Search Report issued on Mar. 30, 2011 in corresponding European Application No. 07 82 9521.

* cited by examiner

Primary Examiner — Binh Q Tran
Assistant Examiner — Audrey K Bradley
(74) Attorney, Agent, or Firm — Oblon, Spivak, McClelland, Maier & Neustadt, L.L.P.

(57) ABSTRACT

An internal combustion engine wherein three-way catalysts are arranged in an exhaust passage of a first cylinder group and an exhaust passage of a second cylinder group and a common $NO_x$ storage catalyst is arranged downstream of the three-way catalysts. When the $NO_x$ storage catalyst should be raised in temperature, the air-fuel ratio of a part of the cylinders in each cylinder group is made rich and the air-fuel ratio of a part of the cylinders in each cylinder group is made lean to raise the $NO_x$ storage catalyst in temperature by the heat of oxidation reaction at the three-way catalysts.

5 Claims, 7 Drawing Sheets

(A)

(B)

(I)

(II)

(III)

EXHAUST GAS PURIFICATION APPARATUS FOR INTERNAL COMBUSTION ENGINE

TECHNICAL FIELD

The present invention relates to an exhaust purification device of an internal combustion engine.

BACKGROUND ART

Known in the art is an internal combustion engine arranging in an engine exhaust passage an $NO_x$ storage catalyst storing $NO_x$ contained in exhaust gas when the air-fuel ratio of the inflowing exhaust gas is lean and releasing the stored $NO_x$ when the air-fuel ratio of the inflowing exhaust gas becomes a stoichiometric air-fuel ratio or rich, wherein cylinders are divided into a first cylinder group and a second cylinder group and an exhaust passage of the first cylinder group and an exhaust passage of the second cylinder group are merged and connected to a common $NO_x$ storage catalyst (see Japanese Patent Publication (A) No. 8-189388). In this internal combustion engine, usually in all cylinders, fuel is burned under a lean air-fuel ratio and the $NO_x$ generated at this time is stored in the $NO_x$ storage catalyst. On the other hand, if the $NO_x$ storage ability of the $NO_x$ storage catalyst approaches saturation, the air-fuel ratio of the exhaust gas flowing into the $NO_x$ storage catalyst is temporarily made rich and thereby $NO_x$ is released from the $NO_x$ storage catalyst and reduced.

In this regard, fuel and lubrication oil contain sulfur. Therefore, the exhaust gas contains $SO_x$. This $SO_x$ is stored together with the $NO_x$ in the $NO_x$ storage catalyst. In this regard, this $SO_x$ is not released from the $NO_x$ storage catalyst by just making the air-fuel ratio of the exhaust gas rich. Therefore, the amount of $SO_x$ stored in the $NO_x$ storage catalyst gradually increases. As a result, the amount of $NO_x$ able to be stored gradually ends up becoming reduced. Therefore, when the amount of $SO_x$ stored in the $NO_x$ storage catalyst increases, it is necessary to make the $NO_x$ storage catalyst release the $SO_x$.

In this case, if the temperature of the $NO_x$ storage catalyst is raised to the $SO_x$ release temperature of substantially 600° C. or more and the air-fuel ratio of the exhaust gas flowing into the $NO_x$ storage catalyst is made rich, the $NO_x$ storage catalyst can be made to release the $SO_x$. In this regard, in the above-mentioned internal combustion engine, when the air-fuel ratios of all cylinders of the first cylinder group are made rich and the air-fuel ratios of the cylinders of the second cylinder group are made lean, the large amount of unburned HC exhausted from the first cylinder group is oxidized at the $NO_x$ storage catalyst by the excess oxygen exhausted from the second cylinder group and the $NO_x$ storage catalyst is raised in temperature by the heat of oxidation reaction at this time. Therefore, in the above-mentioned internal combustion engine, when making the $NO_x$ storage catalyst release $SO_x$ by raising the temperature of the $NO_x$ storage catalyst, the air-fuel ratios of all cylinders of the first cylinder group are made rich and the air-fuel ratios of all cylinders of the second cylinder group are made lean.

However, in this internal combustion engine, the $NO_x$ storage catalyst is arranged in the exhaust passage considerably far from the cylinders, so the $NO_x$ storage catalyst is low in temperature and not activated in many cases. In this regard, when the temperature of the $NO_x$ storage catalyst is low and the $NO_x$ storage catalyst is not activated in this way, if making the air-fuel ratio of one cylinder group rich and making the air-fuel ratio of the other cylinder group lean to raise the temperature of the $NO_x$ storage catalyst, a large amount of unburned HC ends up passing straight through the $NO_x$ storage catalyst without being oxidized and therefore not only is the temperature raising action not sufficiently performed, but also the problem arises that a large amount of unburned HC is exhausted into the atmosphere.

DISCLOSURE OF THE INVENTION

An object of the present invention is to provide an exhaust purification device of an internal combustion engine able to keep the unburned HC from being exhausted into the atmosphere when raising the temperature of the rear stage catalyst.

According to the present invention, there is provided an exhaust purification device of an internal combustion engine in which cylinders are divided into a first cylinder group and a second cylinder group, front stage catalysts having oxidation functions are arranged in a first exhaust passage common to the first cylinder group and in a second exhaust passage common to the second cylinder group, and the first exhaust passage and the second exhaust passage are connected to a common rear stage catalyst having an oxidation function at downstream of the corresponding front stage catalysts, wherein when the temperature of the rear stage catalyst should be raised, an air-fuel ratio of a part of the cylinders in each cylinder group is made rich and an air-fuel ratio of a part of the cylinders of the first cylinder group is made lean, while doing so, the average air-fuel ratio at one of the cylinder groups is made rich and the average air-fuel ratio at the other cylinder group is made lean, and the rear stage catalyst is raised in temperature by the heat of oxidation reaction at both the front stage catalysts and the rear stage catalysts.

BEST MODE FOR CARRYING OUT THE INVENTION

Figure 1:
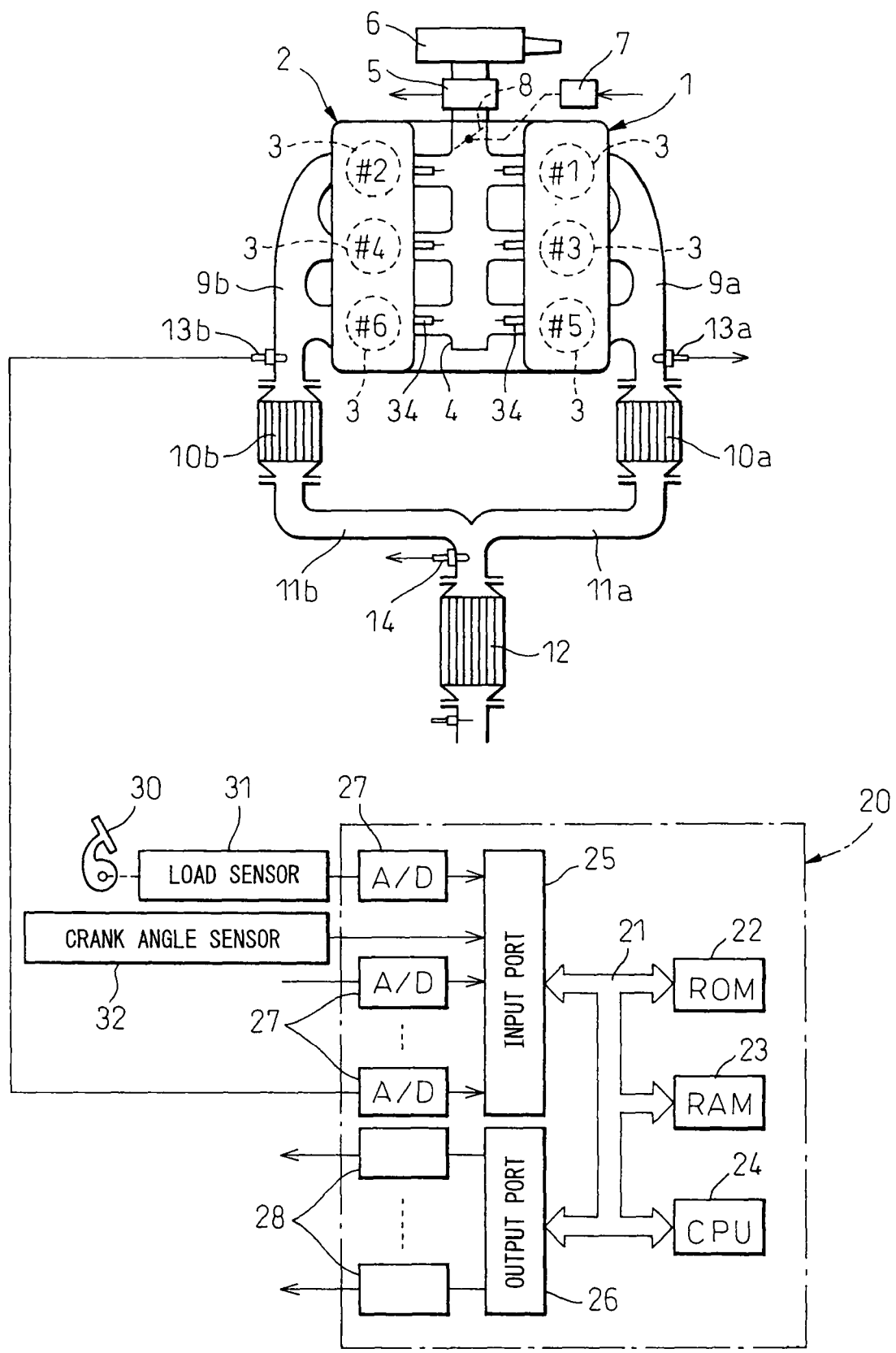
FIG. 1 is an overview of an internal combustion engine.

FIG. 1 shows the case of application of the present invention to a V-type 6-cylinder spark ignition internal combustion engine. Note that needless to say, the present invention can also be applied to an in-line 6-cylinder internal combustion engine or other in-line internal combustion engine and can also be applied to an internal combustion engine having a number of cylinders other than six cylinders.

Referring to FIG. 1, at one bank, a first cylinder group 1 comprised of three cylinders 3 of the no. 1 cylinder #1, no. 3 cylinder #3, and no. 5 cylinder #5 of every other place in the ignition sequence is formed, while at the other bank, a second cylinder group 2 comprised of three cylinders 3 of the no. 2 cylinder #2, no. 4 cylinder #4, and no. 6 cylinder #6 of every other place in the ignition sequence is formed. The cylinders 3 of the first cylinder group 1 and the second cylinder group 2 are connected to a common intake manifold 4, while an inlet of an intake manifold 4 is connected through an air flow meter 5 to an air cleaner 6. At the inlet of the intake manifold 4 is arranged a throttle valve 8 controlled to open and close by an actuator 7.

On the other hand, the cylinders #1, #3, and #5 of the first cylinder group 1 are connected through a common first exhaust manifold 9a to an inlet of a front stage catalyst 10a having an oxidation function, while the cylinders #2, #4, and #6 of the second cylinder group 2 are connected through a common second exhaust manifold 9b to an inlet of a front stage catalyst 10b having an oxidation function. The outlet of the front stage catalyst 10a and the outlet of the front stage catalyst 10b are connected through respectively corresponding exhaust pipes 11a and 11b to the inlet of a common rear stage catalyst 12 having an oxidation function. In the embodiment according to the present invention, the front stage catalyst 10a and the front stage catalyst 10b are comprised of three-way catalysts, while the rear stage catalyst 12 is comprised of an $NO_x$ storage catalyst.

An electronic control unit 20 is comprised of a digital computer provided with a ROM (read only memory) 22, RAM (random access memory) 23, CPU (microprocessor) 24, input port 25, and output port 26, which are interconnected by a bidirectional bus 21. At the inlet of the front stage catalysts, that is, the three-way catalysts 10a, 10b, air-fuel ratio sensors 13a, 13b are respectively arranged, while at the inlet of the rear stage catalyst, that is, the $NO_x$ storage catalyst 12, an air-fuel ratio sensor 14 is arranged. The output signals of these air-fuel ratio sensors 13a, 13b, and 14 are input through respectively corresponding AD converters 27 to the input port 25.

The accelerator pedal 30 has a load sensor 31 connected to it generating an output voltage proportional to an amount of depression L of the accelerator pedal 30. The output voltage of the load sensor 31 is input through a corresponding AD converter 27 to the input port 25. Furthermore, the input port 25 has connected to it a crank angle sensor 32 generating an output pulse each time a crankshaft rotates by for example 30°. On the other hand, the output port 26 is connected through corresponding drive circuits 28 to the actuator 7 of the throttle valve 8 and fuel injectors 34 for feeding fuel to the cylinders #1 to #6.

Figure 2:
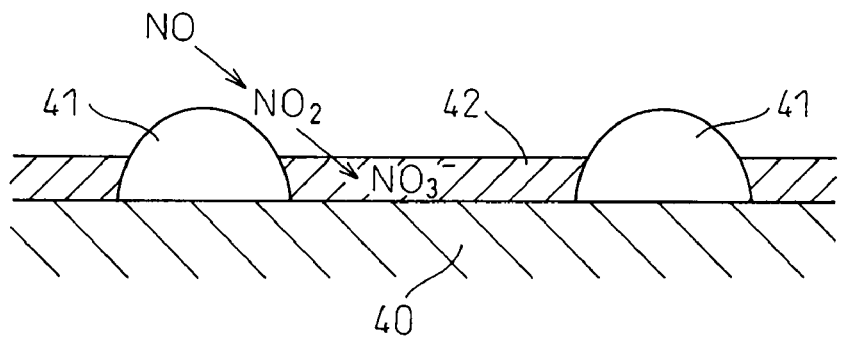
FIG. 2 is a cross-sectional view of a surface part of a catalyst carrier of an $NO_x$ storage catalyst.

Next, the $NO_x$ storage catalyst 12 will be explained. The substrate of the $NO_x$ storage catalyst 12 carries for example a catalyst carrier comprised of alumina. FIG. 2 shows a cross-section of a surface part of this catalyst carrier 40. As shown in FIG. 2, on the surface of the catalyst carrier 40, a precious metal catalyst 41 is carried dispersed. Further, on the surface of the catalyst carrier 40, a layer of an $NO_x$ absorbent 42 is formed.

In the embodiment according to the present invention, platinum Pt is used as the precious metal catalyst 41. As the ingredient forming the $NO_x$ absorbent 42, for example, at least one element selected from potassium K, sodium Na, cesium Cs, and other such alkali metals, barium Ba, calcium Ca, and other such alkali earths, and lanthanum La, yttrium Y, and other such rare earths is used.

If the ratio of the air and fuel fed into the engine intake passage, combustion chambers, and exhaust passage upstream of the $NO_x$ storage catalyst 12 is referred to as "the air-fuel ratio of the exhaust gas", an $NO_x$ absorption and release action such as the $NO_x$ absorbent 42 absorbs $NO_x$ when the air-fuel ratio of the exhaust gas is lean and releases the absorbed $NO_x$ when the oxygen concentration in the exhaust gas falls, is performed.

That is, if explaining as an example the case of using barium Ba as the ingredient forming the $NO_x$ absorbent 42, when the air-fuel ratio of the exhaust gas is lean, that is, when the oxygen concentration in the exhaust gas is high, the NO contained in the exhaust gas, as shown in FIG. 2, is oxidized on the platinum Pt 41 and becomes $NO_2$ which is then absorbed in the $NO_x$ absorbent 42, bonds with the barium oxide BaO, and diffuses in the form of nitrate ions $NO_3^-$ in the $NO_x$ absorbent 42. In this way, $NO_x$ is absorbed in the $NO_x$ absorbent 42. So long as the oxygen concentration in the exhaust gas is high, $NO_2$ is formed on the surface of the platinum Pt 41. So long as the $NO_x$ absorption ability of the $NO_x$ absorbent 42 is not saturated, $NO_2$ is absorbed in the $NO_x$ absorbent 42 and nitrate ions $NO_3^-$ are produced.

As opposed to this, when the air-fuel ratio of the exhaust gas is made rich or the stoichiometric air-fuel ratio, the oxygen concentration in the exhaust gas falls, so the reaction proceeds in the reverse direction ($NO_3^- \rightarrow NO_2$) and therefore the nitrate ions $NO_3^-$ in the $NO_x$ absorbent 42 are released in the form of $NO_2$ from the $NO_x$ absorbent 42. Next, the released $NO_x$ is reduced by the unburned HC and CO contained in the exhaust gas.

In this way, when the air-fuel ratio of the exhaust gas is lean, that is, when fuel is burned under a lean air-fuel ratio, the $NO_x$ in the exhaust gas is absorbed in the $NO_x$ absorbent 42. However, if fuel continues to be burned under a lean air-fuel ratio, during that time the $NO_x$ absorption ability of the $NO_x$ absorbent 42 ends up becoming saturated and therefore the $NO_x$ absorbent 42 ends up no longer being able to absorb $NO_x$. Therefore, in the embodiment according to the present invention, before the absorption ability of the $NO_x$ absorbent 42 is saturated, the air-fuel ratio of the exhaust gas is temporarily made rich and thereby the $NO_x$ absorbent 42 is made to release $NO_x$.

In this regard, the exhaust gas contains $SO_x$, that is, $SO_2$. When this $SO_2$ flows into the $NO_x$ storage catalyst 12, this $SO_2$ is oxidized on the platinum Pt 41 and becomes $SO_3$. Next, this $SO_3$ is absorbed in the $NO_x$ absorbent 42, bonds with the barium oxide BaO, and diffuses in the form of sulfate ions $SO_4^{2-}$ in the $NO_x$ absorbent 42 whereby stable sulfate $BaSO_4$ is produced. However, the $NO_x$ absorbent 42 has a strong basicity, so this sulfate $BaSO_4$ is stable and hard to break down. If just simply making the air-fuel ratio of the exhaust gas rich, the sulfate $BaSO_4$ remains without breaking down. Therefore, as time passes, the sulfate $BaSO_4$ increases in the $NO_x$ absorbent 42. Therefore, the amount of $NO_x$ which the $NO_x$ absorbent 42 can absorb falls, so when the amount of sulfate $BaSO_4$ in the $NO_x$ absorbent 42 increases, it is necessary to make the $NO_x$ absorbent 42 release the $SO_x$.

In this regard, in this case, if making the air-fuel ratio of the exhaust gas flowing into the $NO_x$ storage catalyst 12 rich in the state where the temperature of the $NO_x$ storage catalyst 12 is raised to the $SO_x$ release temperature of 600° C. or more, the $NO_x$ absorbent 42 releases the $SO_x$. Therefore, when the $NO_x$ absorbent 42 should release the $SO_x$, first, the $NO_x$ storage catalyst 12 is raised in temperature to the $SO_x$ release temperature for temperature raising control of the $NO_x$ storage catalyst 12, then $SO_x$ release control such as the $NO_x$ storage catalyst 12 is held in temperature at the $SO_x$ release temperature and the air-fuel ratio of the exhaust gas flowing into the $NO_x$ storage catalyst 12 is made rich, is performed.

Figure 3:
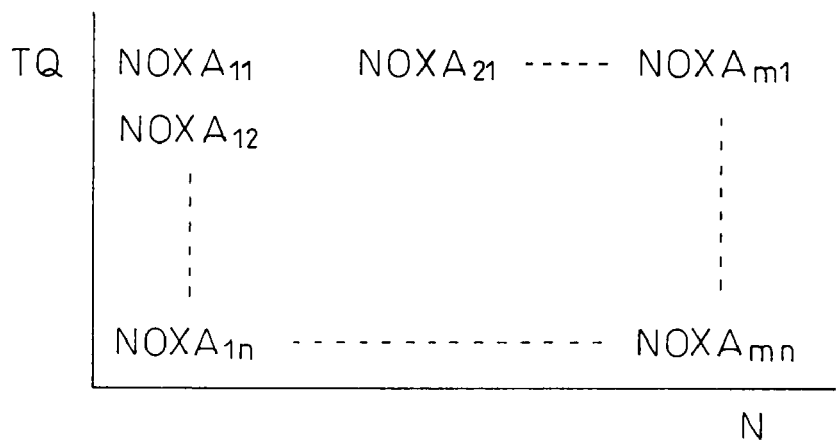
FIG. 3 is a view showing a map of a stored $NO_x$ amount NOXA etc.
Figure 3:
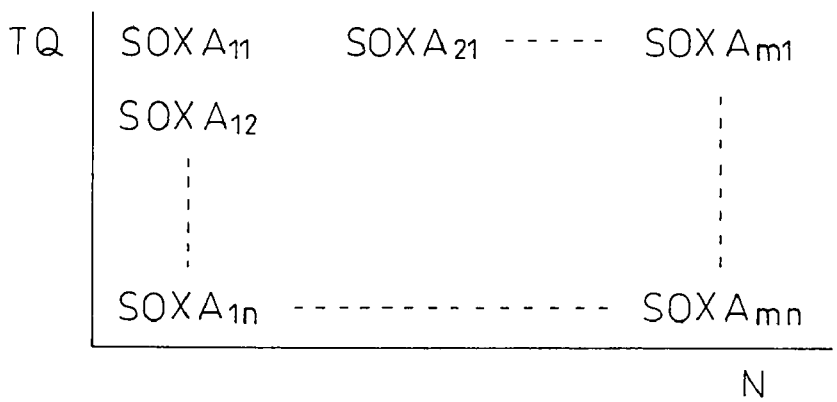
Figure 4:
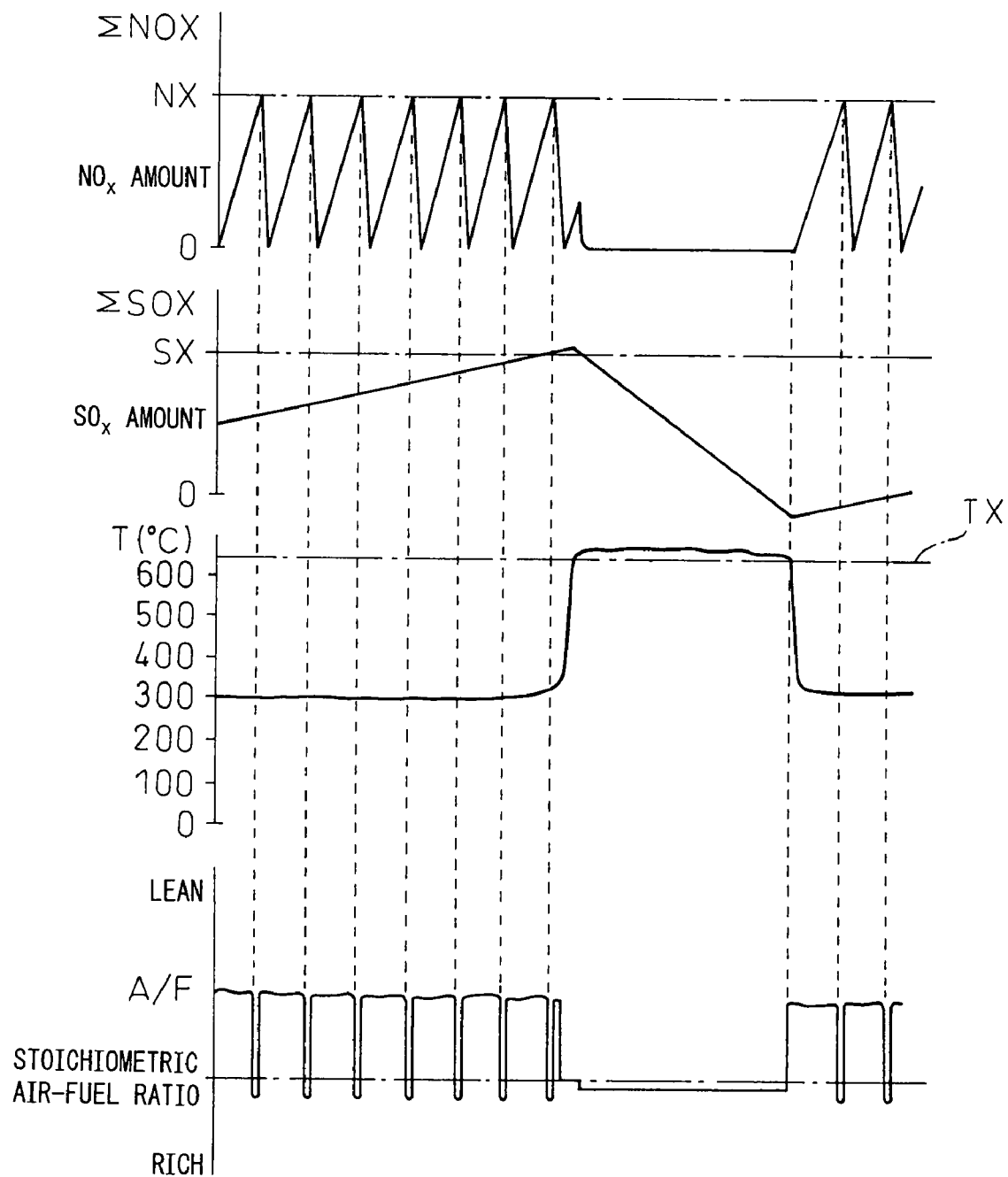
FIG. 4 is a time chart showing $NO_x$ release control and $SO_x$ release control.

Next, the $NO_x$ release control and $SO_x$ release control performed in the embodiment of the present invention will be explained in brief with reference to FIG. 3 to FIG. 5.

The $NO_x$ amount exhausted from the engine changes in accordance with the operating state of the engine and therefore the $NO_x$ amount absorbed in the $NO_x$ absorbent 42 also changes in accordance with the operating state of the engine. Therefore, in the embodiment according to the present invention, the $NO_x$ amount NOXA stored per unit time in the $NO_x$ storage catalyst 12 is stored as a function of the required torque TQ and engine speed N in the form of the map shown in FIG. 3(A) in advance in the ROM 22. By cumulatively adding this $NO_x$ amount NOXA, the $NO_x$ amount ΣNOX stored in the $NO_x$ storage catalyst 12 is calculated. In the embodiment according to the present invention, as shown in FIG. 4, each time this $NO_x$ amount ΣNOX reaches the allowable value NX, the air-fuel ratio of the exhaust gas A/F flowing into the $NO_x$ storage catalyst 12 is temporarily made rich and thereby $NO_x$ is released from the $NO_x$ storage catalyst 12.

On the other hand, fuel contains a certain ratio of sulfur. Therefore, the amount of $SO_x$ contained in the exhaust gas, that is, the amount of $SO_x$ stored in the $NO_x$ storage catalyst 12, is proportional to the fuel injection amount. The fuel injection amount is a function of the required torque and engine speed. Therefore, the amount of $SO_x$ stored in the $NO_x$ storage catalyst 12 becomes a function of the required torque and engine speed. In the embodiment according to the present invention, the $SO_x$ amount SOXA stored in the $NO_x$ storage catalyst 12 per unit time is stored as a function of the required torque TQ and engine speed N in the form of the map shown in FIG. 3(B) in advance in the ROM 22. By cumulatively adding this $SO_x$ amount SOXA, the $SO_x$ amount ΣSOX stored in the $NO_x$ storage catalyst 12 is calculated. In the embodiment according to the present invention, as shown in FIG. 4, when this $SO_x$ amount ΣSOX reaches the allowable value SX, the $NO_x$ storage catalyst 12 is raised in temperature T to the $SO_x$ release temperature TX. In the state where the $NO_x$ storage catalyst 12 is held in temperature T at the $SO_x$ release temperature TX, the air-fuel ratio of the exhaust gas flowing into the $NO_x$ storage catalyst 12 is made rich.

Figure 5:
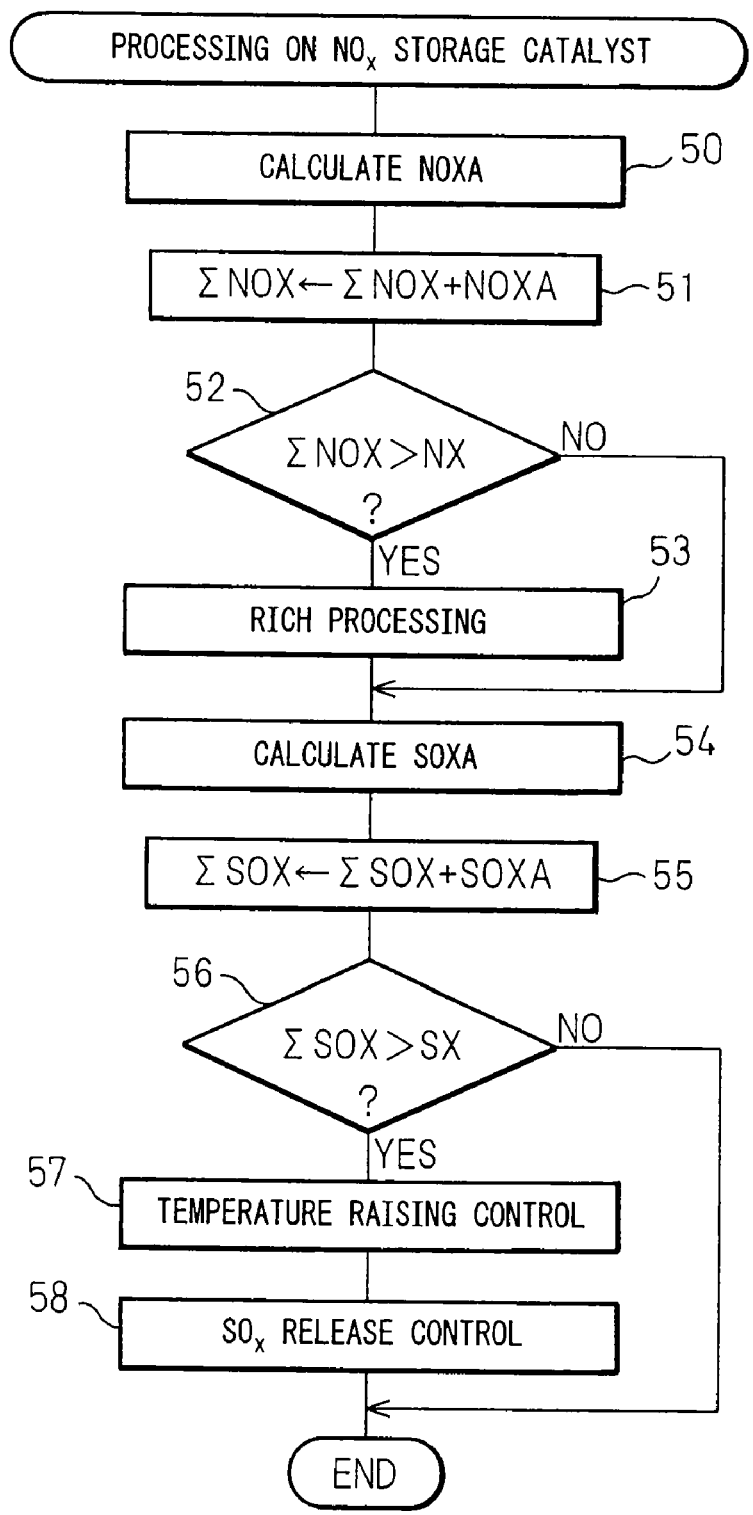
FIG. 5 is a flow chart of processing on an $NO_x$ storage catalyst.

FIG. 5 shows the processing routine for the $NO_x$ storage catalyst 12.

Referring to FIG. 5, first, at step 50, the $NO_x$ amount NOXA stored per unit time is calculated from the map shown in FIG. 3(A). Next, at step 51, this NOXA is added to the $NO_x$ amount ΣNOX stored in the $NO_x$ storage catalyst 12. Next, at step 52, it is judged if the stored $NO_x$ amount ΣNOX exceeds the allowable value NX. When ΣNOX>NX, the routine proceeds to step 53 where rich processing such as the fuel injection amount is increased and thereby the air-fuel ratio of the exhaust gas flowing into the $NO_x$ storage catalyst 12 is temporarily switched from lean to rich, is performed and ΣNOX is cleared.

Next, at step 54, the $SO_x$ amount SOXA stored per unit time is calculated from the map shown in FIG. 3(B). Next, at step 55, this SOXA is added to the $SO_x$ amount ΣSOX stored in the $NO_x$ storage catalyst 12. Next, at step 56, it is judged if the stored $SO_x$ amount ΣSOX exceeds the allowable value SX. When ΣSOX>SX, the routine proceeds to step 57 where temperature raising control such the $NO_x$ storage catalyst 12 is raised in temperature T to the $SO_x$ release temperature TX is performed. Next, at step 58, $SO_x$ release control such as the $NO_x$ storage catalyst 12 is maintained in temperature at the $SO_x$ release temperature TX and the air-fuel ratio of the exhaust gas flowing into the $NO_x$ storage catalyst 12 is made rich, is performed and ΣSOX is cleared.

Now, in the present invention, at step 57 of FIG. 5, when raising the $NO_x$ storage catalyst 12 in temperature to the $SO_x$ release temperature TX, the air-fuel ratio in each cylinder 3 is changed in various ways. To explain this, (I), (II), and (III) of FIG. 6 show an engine body illustrating only the first cylinder group 1 and second cylinder group 2 in FIG. 1.

Figure 6:
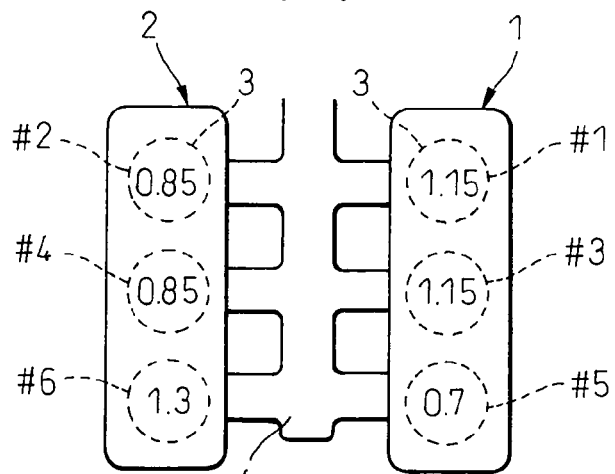
FIG. 6 is a view of a lean-rich cylinder arrangement.
Figure 6:
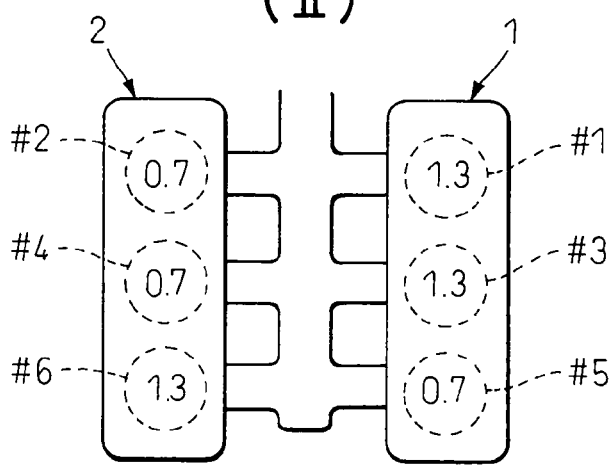
Figure 6:
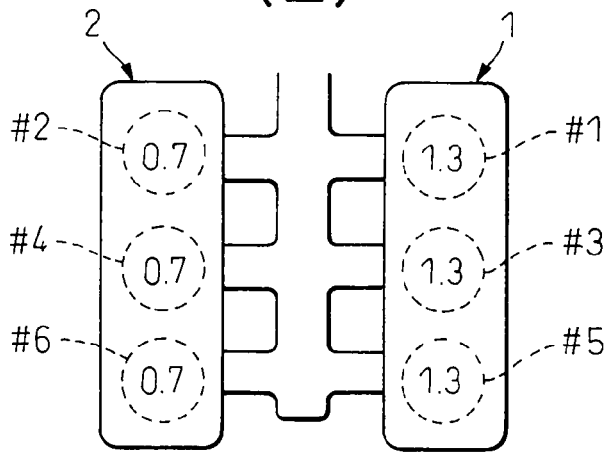

Note that in (I), (II), and (III) of FIG. 6, for easy understanding of the invention, the amount of fuel when indexed to the amount of fuel at the time of the stoichiometric air-fuel ratio as 1.0 is used to express the extent of the degree of richness and leanness at the cylinders #1 to #6. The larger the value from 1.0, the higher the degree of richness, while the smaller the value from 1.0, the greater the degree of leanness.

Note that the relationship between the numerical values shown at the cylinders #1 to #6 and the air-fuel ratio.

| Numerical value shown at cylinder | Air-fuel ratio | Name |
|---|---|---|
| 1.3 | 11.2 | Strongly rich |
| 1.15 | 12.6 | Weakly rich |
| 0.85 | 17.1 | Weakly lean |
| 0.7 | 20.7 | Strongly lean |

When the numerical values shown at the cylinders are 1.3, 1.15, 0.85, and 0.7 as described in the column "Name" of the above table, they are called "strongly rich", "weakly rich", "weakly lean", and "strongly lean".

Figure 7:
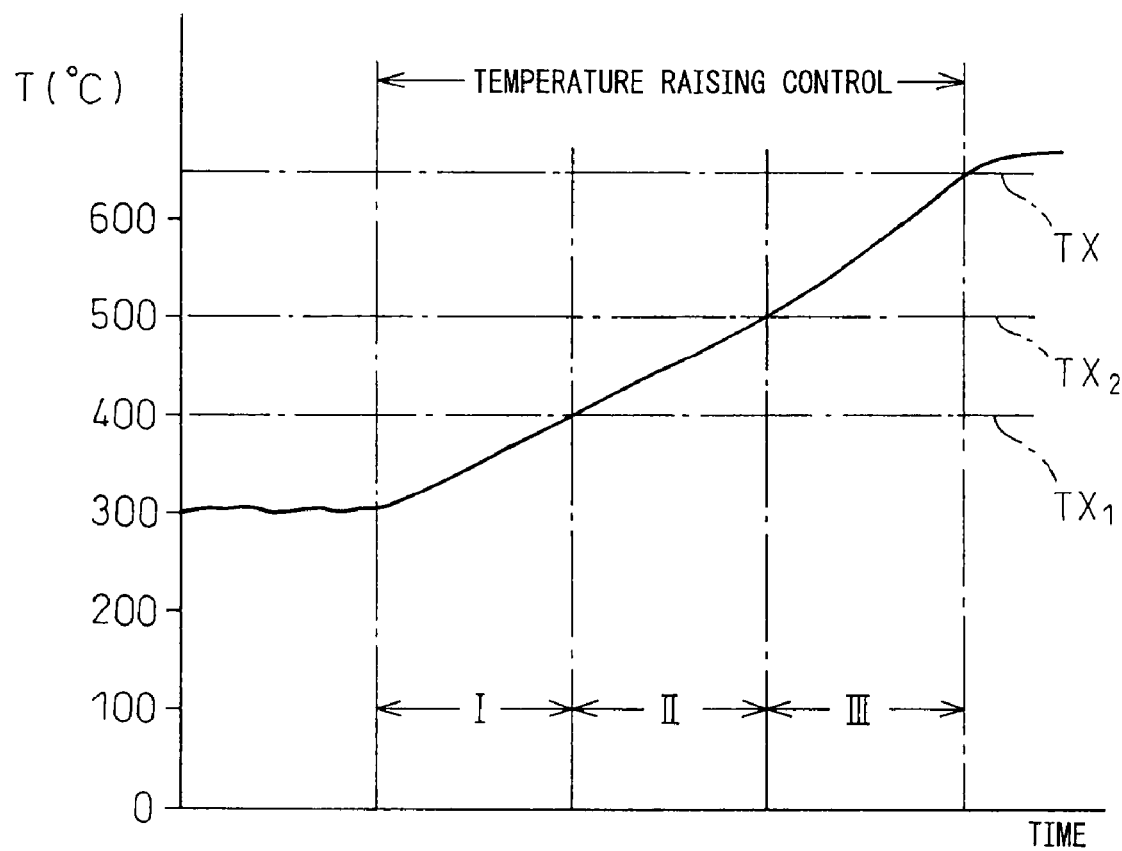
FIG. 7 is a time chart showing temperature raising control.

FIG. 7 shows an embodiment of the temperature raising control according to the present invention. In FIG. 7, the ordinate T shows the temperature of the $NO_x$ storage catalyst 12, while the abscissa shows the elapsed time. Note that FIG. 7 shows the case where the temperature T of the $NO_x$ storage catalyst 12 when the temperature raising control is started is considerably lower than the $SO_x$ release temperature TX. Next, referring to FIG. 6 and FIG. 7, the temperature raising control according to the present invention will be explained.

In the past, when the temperature raising control is started, as shown in (III) of FIG. 6, all cylinders #1, #3, and #5 of one cylinder group, for example, the first cylinder group 1, are made strongly rich, while all cylinders #2, #4, and #6 of the other cylinder group, for example, the second cylinder group 2, are made strongly lean. When all cylinders #1, #3, and #5 of the first cylinder group 1 are made strongly rich in this way, a large amount of unburned HC is exhausted from the first cylinder group 1, while when all cylinders #2, #4, and #6 of the second cylinder group 2 are made strongly lean, a large amount of excess oxygen is exhausted from the second cylinder group 2, so if the $NO_x$ storage catalyst 12 is activated at this time, a strong heat of oxidation reaction is generated at the $NO_x$ storage catalyst 12 and therefore the $NO_x$ storage catalyst 12 is made to rapidly rise in temperature.

In this regard, when the $NO_x$ storage catalyst 12 is activated at this time, a large amount of unburned HC passes straight through the $NO_x$ storage catalyst 12 without being oxidized and is exhausted into the atmosphere. Therefore, in the present invention, when the $NO_x$ storage catalyst 12 should be raised in temperature, if the $NO_x$ storage catalyst 12 is not activated, as shown in (I) of FIG. 6, the average air-fuel ratio of all cylinders #1, #3, and #5 of one cylinder group, for example, the first cylinder group 1, is made to become the substantially stoichiometric air-fuel ratio by the two cylinders #1 and #3 in the first cylinder group 1 being made weakly rich and one cylinder #5 being made strongly lean, and the average air-fuel ratio of all cylinders #2, #4, and #6 of the other cylinder group, for example, the second cylinder group 2 is made to become the substantially stoichiometric air-fuel ratio by the two cylinders #2 and #4 in the second cylinder group 2 being made weakly lean and one cylinder #6 being made strongly rich.

In this regard, the front stage catalysts, that is, the three-way catalysts 10*a* and 10*b*, are positioned closer to the cylinders #1 to #6 compared with the $NO_x$ storage catalyst 12, so are constantly in contact with the relatively high temperature exhaust gas, so these three-way catalysts 10*a* and 10*b* are normally activated. Therefore, as explained above, if a part of the cylinders is made rich and a part of the cylinders is made lean, the unburned HC exhausted from a rich cylinder can be oxidized by the excess oxygen exhausted from a lean cylinder on the corresponding three-way catalysts 10a and 10b. As a result, the exhaust gas flowing through the three-way catalysts 10a and 10b is raised in temperature by the heat of the oxidation reaction by the oxidation action on the three-way catalysts 10a and 10b and the $NO_x$ storage catalyst 12 is quickly raised in temperature by the exhaust gas raised in temperature.

Further, in the case shown in (I) of FIG. 6, the average air-fuel ratio of all cylinders #1, #3, and #5 of the first cylinder group 1 is made to become the substantially stoichiometric air-fuel ratio by two cylinders #1 and #3 in the first cylinder group 1 being made weakly rich and one cylinder #5 being made strongly lean, so the majority of the unburned HC exhausted from the weakly rich cylinders #1 and #3 is oxidized by the excess oxygen exhausted from the strongly lean cylinder #5.

Similarly, the average air-fuel ratio of all cylinders #2, #4, and #6 of the second cylinder group 2 is made to become the substantially stoichiometric air-fuel ratio by the two cylinders #2 and #4 in the second cylinder group 2 being made weakly lean and one cylinder #6 being made strongly rich, so the majority of the unburned HC exhausted from the strongly rich cylinder #6 is oxidized by the excess oxygen exhausted from the weakly lean cylinders #2 and #4. Therefore, the exhaust gas fed into the $NO_x$ storage catalyst 12 does not contain almost any unburned HC, therefore even if the $NO_x$ storage catalyst 12 is not activated, almost no unburned HC is exhausted into the atmosphere.

Further, in the embodiment according to the present invention, in the case shown in (I) of FIG. 6, the air-fuel ratios of the cylinders #1, #3, and #5 of the first cylinder group 1 are feedback controlled based on the output signal of the air-fuel ratio sensor 13a so that the average air-fuel ratio of all cylinders #1, #3, and #5 of the first cylinder group 1 becomes the stoichiometric air-fuel ratio. Therefore, the unburned HC, CO, and $NO_x$ in the exhaust gas exhausted from the first cylinder group 1 are simultaneously reduced in the three-way catalyst 10a. Similarly, the air-fuel ratios of the cylinders #2, #4, and #6 of the second cylinder group 2 are feedback controlled based on the output signal of the air-fuel ratio sensor 13b so that the average air-fuel ratio of all cylinders #2, #4, and #6 of the second cylinder group 2 becomes the stoichiometric air-fuel ratio. Therefore, the unburned HC, CO, and $NO_x$ in the three-way catalyst 10b exhausted from the second cylinder group 2 are simultaneously reduced in the discharged exhaust gas.

As opposed to this, in the example shown in (II) of FIG. 6, the average air-fuel ratio of all cylinders #1, #3, and #5 of one cylinder group, for example, the first cylinder group 1, is made to become rich by the two cylinders #1 and #3 of the first cylinder group 1 being made strongly rich and one cylinder #5 being made strongly lean, while the average air-fuel ratio of all cylinders #2, #4, and #6 of the other cylinder group, for example, the second cylinder group 2, is made to become lean by the two cylinders #2 and #4 of the second cylinder group 2 being made strongly lean and one cylinder #6 being made strongly rich.

In this example, part of the unburned HC exhausted from the strongly rich cylinders #1 and #3 in the first cylinder group 1 is oxidized by the excess oxygen exhausted from the strongly lean cylinder #5 on the three-way catalyst 10a and the remainder of the excess unburned HC is fed to the $NO_x$ storage catalyst 12. On the other hand, the unburned HC exhausted from the strongly rich cylinder #6 in the second cylinder group 2 is oxidized by part of the excess oxygen exhausted from the strongly lean cylinders #2 and #4 on the three-way catalyst 10b and the remainder of the excess oxygen is fed to the $NO_x$ storage catalyst 12.

In this example, the heat of oxidation reaction due to the oxidation action on the three-way catalysts 10a and 10b is used to raise the exhaust gas flowing through the three-way catalysts 10a and 10b in temperature. The $NO_x$ storage catalyst 12 is raised in temperature by the exhaust gas raised in temperature. Further, in this example, if the $NO_x$ storage catalyst 12 becomes activated, the excess unburned HC fed from the first cylinder group 1 to the $NO_x$ storage catalyst 12 is oxidized by the excess oxygen fed from the second cylinder group 2 to the $NO_x$ storage catalyst 12. The $NO_x$ storage catalyst 12 is raised in temperature by the heat of oxidation reaction due to the oxidation action on the $NO_x$ storage catalyst 12.

As will be understood from the above explanation, in the example shown in (I) of FIG. 6, the $NO_x$ storage catalyst 12 is raised in temperature by the heat of oxidation reaction on the three-way catalysts 10a and 10b. In the example shown in (II) of FIG. 6, the heat of oxidation reaction on both the three-way catalysts 10a and 10b and the $NO_x$ storage catalyst 12 causes the $NO_x$ storage catalyst 12 to be raised in temperature. In the example shown in (III) of FIG. 6, the $NO_x$ storage catalyst 12 is raised in temperature by the heat of oxidation reaction on the $NO_x$ storage catalyst 12.

In the embodiment shown in FIG. 7, when the temperature T of the $NO_x$ storage catalyst 12 is lower than a predetermined first temperature $TX_1$, for example, about 400° C., the lean-rich cylinder arrangement shown in (I) of FIG. 6 is set; when the temperature T of the $NO_x$ storage catalyst 12 is higher than the first temperature $TX_1$ and lower than a predetermined second temperature $TX_2$, for example, about 500° C., the lean-rich cylinder arrangement shown in (II) of FIG. 6 is set; and when the temperature T of the $NO_x$ storage catalyst 12 is higher than the second temperature $TX_2$, the lean-rich cylinder arrangement shown in (III) of FIG. 6 is set. Note that the $NO_x$ storage catalyst 12 also has the function of a three-way catalyst. Therefore, in the case shown in (III) of FIG. 6, the average air-fuel ratio of all cylinders #1 to #6 is made to become the stoichiometric air-fuel ratio by feedback control of the air-fuel ratios of all cylinders #1 to #6 based on the output signal of the air-fuel ratio sensor 14.

Figure 8:
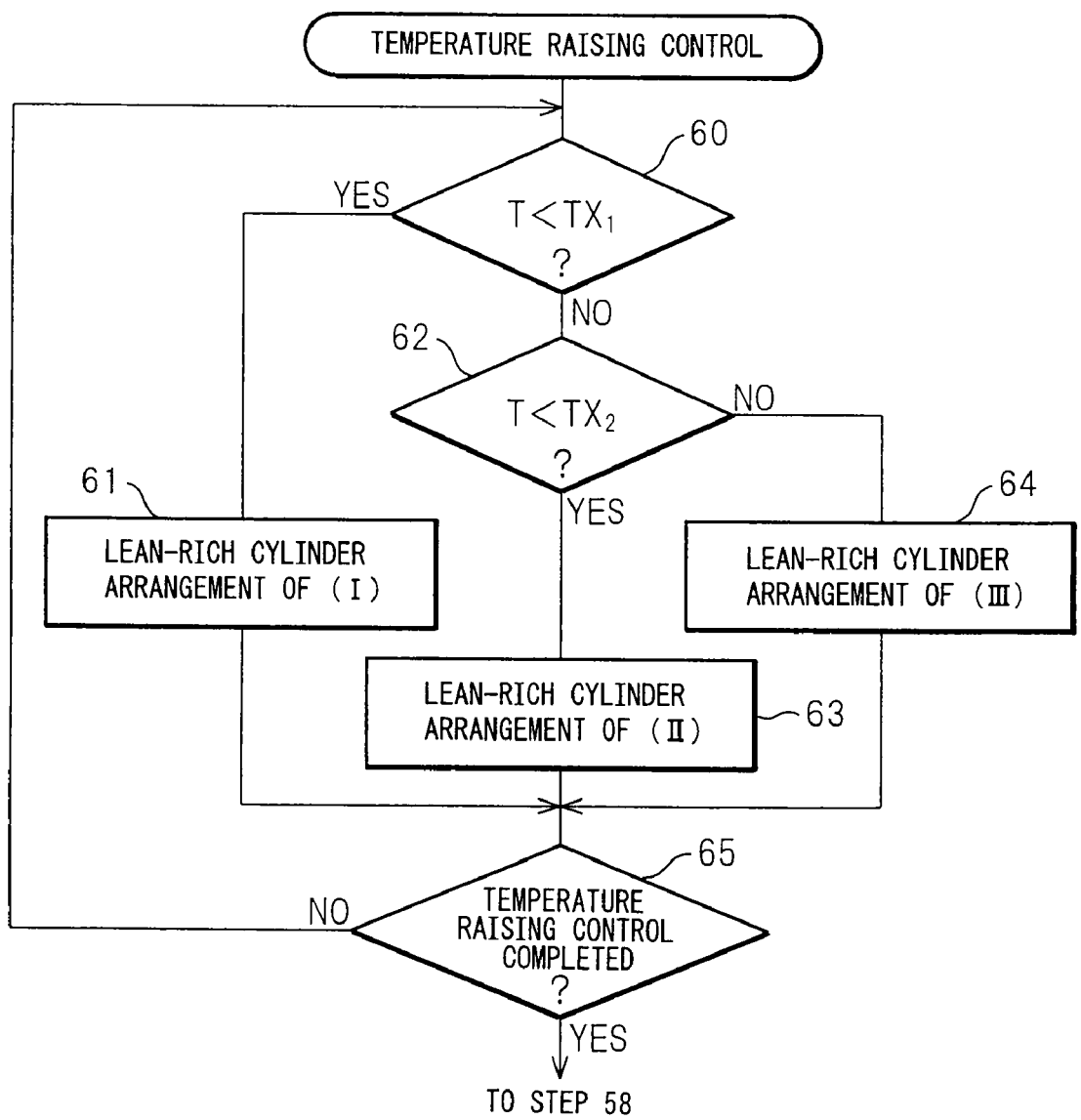
FIG. 8 is a flow chart of temperature raising control.

FIG. 8 shows a routine of temperature raising control performed at step 57 of FIG. 5 for executing the temperature raising control shown in FIG. 7.

Referring to FIG. 8, first, at the initial step 60, it is judged if the temperature T of the $NO_x$ storage catalyst 12 is lower than the first temperature $TX_1$. When $T<TX_1$, the routine proceeds to step 61 where the lean-rich cylinder arrangement shown in (I) of FIG. 6 is set. Next, the routine proceeds to step 65 where it is judged if the temperature raising control has been completed. When not completed, the routine returns to step 60.

When it is judged at step 60 that $T \geq TX_1$, the routine proceeds to step 62 where it is judged if the temperature T of the $NO_x$ storage catalyst 12 is lower than the second temperature $TX_2$. When $T<TX_2$, the routine proceeds to step 63 where the lean-rich cylinder arrangement shown in (II) of FIG. 6 is set, then the routine proceeds to step 65. On the other hand, when it is judged at step 62 that $T \geq TX_2$, the routine proceeds to step 64 where the lean-rich cylinder arrangement shown in (III) of FIG. 6 is set, then the routine proceeds to step 65. At step 65, when it is judged that the temperature raising control has been completed, the routine proceeds to step 58 of FIG. 5.

Note that in the temperature raising control shown in FIG. 7, the lean-rich cylinder arrangement shown in (II) of FIG. 6 is omitted. The lean-rich cylinder arrangement shown in (I) of FIG. 6 can be switched to the lean-rich cylinder arrangement shown in (III) of FIG. 6. Further, at the time of the temperature elevation control, it is also possible to use only the lean-rich cylinder arrangement shown in (II) of FIG. 6 to raise the temperature of the $NO_x$ storage catalyst 12.

| LIST OF REFERENCE NUMERALS | |
|---|---|
| 1 | first cylinder group |
| 2 | second cylinder group |
| 3 | cylinder |
| 9a | first exhaust manifold |
| 9b | second exhaust manifold |
| 10a, 10b | front stage catalyst |
| 12 | rear stage catalyst |

The invention claimed is:

1. An exhaust purification device of an internal combustion engine in which cylinders are divided into a first cylinder group and a second cylinder group, comprising:
    front stage catalysts having oxidation functions arranged in a first exhaust passage common to the first cylinder group and in a second exhaust passage common to the second cylinder group; and
    a rear stage catalyst having an oxidation function downstream of the corresponding front stage catalysts, the rear stage catalyst being connected to the first exhaust passage and the second exhaust passage, wherein
    when the temperature of the rear stage catalyst is to be raised, if a temperature of the rear stage catalyst is lower than a predetermined first temperature, an air-fuel ratio of at least one of the cylinders of the first cylinder group is made rich and an air-fuel ratio of remaining cylinders of the first cylinder group is made lean and an air-fuel ratio of at least one of the cylinders of the second cylinder group is made rich and an air-fuel ratio of remaining cylinders of the second cylinder group is made lean, so as to raise the temperature of the rear stage catalyst by heat of an oxidation reaction at the front stage catalysts;
    if the temperature of the rear stage catalyst is higher than the predetermined first temperature and lower than a predetermined second temperature, the air-fuel ratio of the at least one of the cylinders of the first cylinder group is made rich and the air-fuel ratio of the remaining cylinders of the first cylinder group is made lean and the air-fuel ratio of the at least one of the cylinders of the second cylinder group is made rich and the air-fuel ratio of the remaining cylinders of the second cylinder group is made lean, an average air-fuel ratio at one of the cylinder groups is made rich and an average air-fuel ratio at the other cylinder group is made lean, so as to raise the temperature of the rear stage catalyst by the heat of the oxidation reaction at the front stage catalysts and of an oxidation reaction at the rear stage catalyst; and
    if the temperature of the rear stage catalyst is higher than the predetermined second temperature, air-fuel ratios of all of the cylinders of either cylinder group among the first cylinder group and second cylinder group are made rich and the air-fuel ratios of all of the cylinders of the other cylinder group are made lean, so as to raise the rear stage catalyst in temperature by the heat of oxidation reaction at the rear stage catalyst.

2. An exhaust purification device of an internal combustion engine as claimed in claim 1, wherein when the temperature of the rear stage catalyst is lower than the predetermined first temperature and the rear stage catalyst is raised in temperature by the heat of the oxidation reaction at the front stage catalysts, an average air-fuel ratio at each cylinder group is made substantially stoichiometric.

3. An exhaust purification device of an internal combustion engine as claimed in claim 1, wherein when the temperature of the rear stage catalyst is higher than the predetermined second temperature and the rear stage catalyst is raised in temperature by the heat of the oxidation reaction at the rear stage catalyst, an average air-fuel ratio at all of the cylinders is made substantially stoichiometric.

4. An exhaust purification device of an internal combustion engine as claimed in claim 1, wherein said front stage catalysts are comprised of three-way catalysts.

5. An exhaust purification device of an internal combustion engine as claimed in claim 1, wherein said rear stage catalyst is comprised of an NOx storage catalyst that stores NOx contained in an exhaust gas when an air-fuel ratio of an inflowing exhaust gas is lean and that releases the stored NOx when the air-fuel ratio of the inflowing exhaust gas becomes stoichiometric or rich.

* * * * *